US010147061B2

(12) United States Patent
Faulkner

(10) Patent No.: US 10,147,061 B2
(45) Date of Patent: Dec. 4, 2018

(54) INTEGRATING A CONSTRUCTION JOBSITE SYSTEM WITH EXTERNAL TOOLS

(71) Applicant: Applied Software Technology, Inc., Atlanta, GA (US)

(72) Inventor: Jason Faulkner, Atlanta, GA (US)

(*) Notice: Subject to any disclaimer, the term of this patent is extended or adjusted under 35 U.S.C. 154(b) by 342 days.

(21) Appl. No.: 14/754,649

(22) Filed: Jun. 29, 2015

(65) Prior Publication Data

US 2016/0379146 A1 Dec. 29, 2016

(51) Int. Cl.
*G06F 9/44* (2018.01)
*G06Q 10/06* (2012.01)
*H04L 29/08* (2006.01)
*G06Q 50/08* (2012.01)

(52) U.S. Cl.
CPC ....... *G06Q 10/06311* (2013.01); *G06Q 50/08* (2013.01); *H04L 67/02* (2013.01); *H04L 67/34* (2013.01)

(58) Field of Classification Search
CPC ..... G06F 8/20; G06F 8/34; G06F 8/38; G06F 8/70; G06F 8/71; G06F 17/3089; G06Q 10/06311; G06Q 50/08; H04L 67/02; H04L 67/34

See application file for complete search history.

(56) References Cited

U.S. PATENT DOCUMENTS

| 6,064,813 | A * | 5/2000 | Sitbon | G06F 9/45512 |
| | | | | 717/100 |
| 2005/0177818 | A1* | 8/2005 | Huene | G06F 8/71 |
| | | | | 717/116 |
| 2006/0258342 | A1* | 11/2006 | Fok | G06F 9/4411 |
| | | | | 455/414.1 |
| 2016/0110377 | A1* | 4/2016 | Yun | G06F 17/30174 |
| | | | | 713/165 |
| 2016/0246592 | A1* | 8/2016 | Jamjoom | G06F 8/70 |

OTHER PUBLICATIONS

Samuel Hsiao-Heng Chang et al., Issues of Extending the User Interface of Integrated Development Environments, ACM, 2008, retrieved online on Aug. 24, 2018, pp. 23-30. Retrieved from the Internet: <URL: http://delivery.acm.org/10.1145/1500000/1496980/p23-chang.pdf?>. (Year: 2008).*

* cited by examiner

*Primary Examiner* — Hanh Thi-Minh Bui
(74) *Attorney, Agent, or Firm* — Clayton, McKay & Bailey, PC

(57) ABSTRACT

Systems and methods presented herein can allow a user to integrate an existing construction jobsite system with external tools, such as spreadsheet software or a database. An integration platform can allow a user to create, select, and configure plugins that interface with a wrapper on the construction jobsite system to translate procedure calls, files, and data between the construction jobsite system and the external tools. The integration platform may generate execution commands based on the plug in configurations, and the user may cause the execution command to be executed or scheduled for execution. The execution command can facilitate data synchronization between the external tools (e.g., endpoints) and the construction jobsite system, solving a major problem with construction jobsite systems.

19 Claims, 13 Drawing Sheets

INTEGRATING A CONSTRUCTION JOBSITE SYSTEM WITH EXTERNAL TOOLS

BACKGROUND

Advanced construction jobsite software such as BIM 360 FIELD allow users to review construction plans on site, such as on a mobile device, and raise issues and manage checklists that are visually linked to the construction plans. Instead of carrying around pads of paper, a construction jobsite system allows users to streamline job site inspections, job site workflow, and reporting of field performance.

However, these construction jobsite systems have several technology-specific problems. Most notably, they are self-contained systems that do not integrate with tools that companies traditionally use to track construction and related business information. For example, a company may have its own outside system, such as a file repository for keeping records for many construction projects and related business information. But the construction jobsite system technology prevents easy movement of information to the outside file repository.

Many construction jobsite systems are also limited in terms of reporting functionality. While they may provide basic reporting information, each company or user may desire to analyze or report data in a manner that is difficult or impossible based on the functionality the construction jobsite system provides. Therefore, a company may use external tools such as MICROSOFT EXCEL or other software for tracking projects, reporting, and creating projections. Users may also want flexibility in selecting which external tools they use, to best adapt to business and reporting requirements of particular projects.

Additionally, the construction jobsite systems have their own data repositories that are not accessible by outside software, creating a problem in access and synchronization between the construction jobsite systems and external databases. Even for construction jobsite systems that allow access to data, querying the data may require complex URL calls and script parsing, which adds complications, is outside the realm of what most employees understand, and may make it impossible to work with some external tools. Thus, external tools cannot be flexibly used with the construction jobsite systems.

Therefore, based on at least these technology-specific problems, a need exists for systems and methods for flexibly integrating construction jobsite systems with the external tools (e.g., an endpoint).

SUMMARY

The inventions described herein specifically address problems that arise in the context of construction jobsite systems. Currently, construction jobsite systems are used to track construction progress without any way to easily integrate the data generated, stored, and used by the construction jobsite software with external tools (referred to as "endpoints") that are not part of the construction jobsite system.

Systems described herein flexibly integrate a construction jobsite system to virtually any endpoint (e.g., an external tool), by provision of a graphical user interface that allows a user to flexibly generate and select plugins and specific configurations for interfacing endpoints to the construction jobsite system. The plugins interface with a wrapper on the construction jobsite system for simplified procedure calls. The system can reroute data movement between the construction jobsite system and outside project management systems in order to prevent duplication of data entry. The system also synchronizes files between an endpoint (i.e., an external tool such as WINDOWS EXPLORER, an FTP site, or any product which offers a file repository) and the file library of the construction jobsite system. The system can further synchronize the construction jobsite system data with a an external database, allowing specialized reporting tools to access the construction jobsite system data by using the external database.

One example system comprises a processor that executes instructions to perform stages including receiving a user selection of a plugin and a configuration file for interfacing an endpoint with a wrapper of a construction jobsite software. The plugin may be created for translating and/or synchronizing information between an endpoint (i.e., a particular external tool) and the construction jobsite system. The configuration file may define what work the plugin actually will do. Based on the user selection of the plugin and configuration file, the processor can generate a command for execution.

The command for execution can be scheduled for execution at a start time. At that time, the processor can execute the command, which can include retrieving configuration information from the selected configuration file and instantiating an instance of the wrapper using the configuration information, wherein the wrapper can extend an abstract class based on an application program interface for the construction jobsite system. Using the plugin and configuration information, the processor can convert a first procedure compatible with the endpoint to a second procedure recognized by the instance of the wrapper of the construction jobsite system. The plugin and wrapper instance can then work together to translate data between the construction jobsite system and the endpoint.

Plugins and configurations can be generated and selected for synchronizing data (e.g., files) between the endpoint and the construction jobsite system.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

Figure 1:
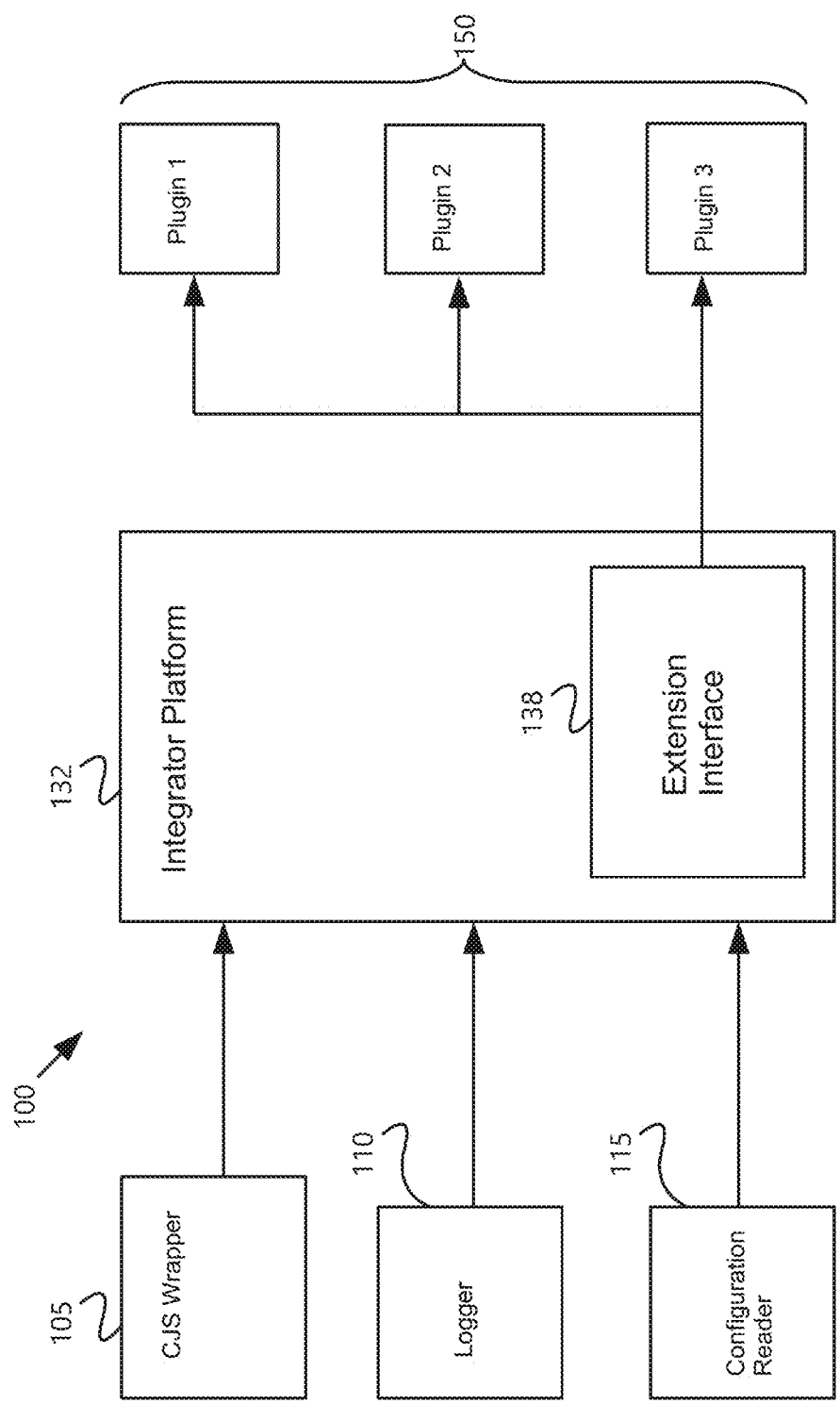
FIG. 1 is an exemplary illustration of system components for integrating a construction jobsite system with endpoints, in accordance with an embodiment.

An Exhibit is also attached with illustrations and explanations of further embodiments.

DESCRIPTION OF THE EMBODIMENTS

Reference will now be made in detail to the present exemplary embodiments, including examples illustrated in the accompanying drawings. Wherever possible, the same reference numbers will be used throughout the drawings to refer to the same or like parts. The described embodiments are all exemplary and non-limiting.

Exemplary systems herein allow a user to integrate an endpoint (i.e., external tool) with a construction jobsite system. A construction jobsite system includes software for storing and viewing construction plans, changes to the plans, task lists related to the plans, visualizations, and other construction-related records. However, construction jobsite systems are currently limited to the tools actually provided as part of those systems.

A system described herein can execute a wrapper on the construction jobsite system application program interface (API). The wrapper may include a plurality of procedure calls that then are translated to API calls recognized by the construction jobsite system. For example, the construction jobsite system API can be limited to HTTP URL calls with Javascript return values, but the wrapper can simplify numerous such calls into a single procedure call and format the data for better use.

The system may also execute an integrator platform that allows a user to specify tasks for execution between an endpoint (i.e., external tool) and the construction jobsite system. The user can be presented with a graphical user interface (GUI), where the user can select a plugin for integrating the endpoint (i.e., external tool) with the wrapper (and, in turn, with the construction jobsite system). Each plugin can extend an abstract interface to the wrapper, such that the plugin can translate functions, data, or other information from an endpoint into a useable procedure call at the wrapper.

Upon selecting a plugin, the user can then select a configuration file for the plugin, or create a new configuration file. The configuration file can specify the work that will be done between the endpoint and the construction jobsite system, such as what should be updated between the systems, where files should be stored, etc. Creation of a configuration file can include additional GUI screens for determining which files or file locations on the endpoint should be mapped to which files or file locations at the construction jobsite system.

Based on the user's selection of the plugin and a configuration file (e.g., an INI file) created by that plugin, the integrator platform can create an execution command that will execute the configuration. For example, the execution command may be of the format "C:\[folder path]\integrator.exe" "[filename].INI." The execution command can cause a processor to execute the integration platform and pass the configuration file as a parameter for use in the execution. The user may run the execution command in a console or make it part of a job that is scheduled to run at various times.

As an example, the user may select a plugin for an endpoint system, then create a configuration file for synchronizing files between the endpoint and the construction jobsite system. This can include a separate GUI screen where the user can map file locations on the endpoint to file locations on the construction jobsite system. The mapping information can then be stored in a new configuration file based on the selected plugin. The interface can generate an execution command for that configuration file, and the user can schedule the execution command to run periodically, such as every 5 minutes.

Upon execution, the configuration file can cause the processor to run the plugin, which may be a class implementing the methods that can interface with the wrapper. The plugin can initialize with an instance of the wrapper based, at least in part, on credentials stored in the configuration file. Configuration information from the configuration file can also be passed to the plugin's initialization method. The plugin can call one or more procedures to do the actual work by making procedure calls on the wrapper.

In this example, the work can include calling subroutines to check values, timestamps, and file names to make sure the files are synchronized between the construction jobsite system and the endpoint. If a file is new or updated on either end, additional subroutines can be called to send that file to the other system, and store it at a location dictated by the mapping in the configuration file. In this way, files or data of either system may be implemented and used in the other.

FIG. 1 includes an exemplary block diagram of system components 100 in accordance with an embodiment. The integrator platform 132 may execute via a processor to extend functionality of a pre-existing construction jobsite system. The integrator platform 132 can tie together system 100 components on both the construction jobsite side (left) and endpoint side (right).

To interface with the construction jobsite system, integrator platform 132 can utilize a construction jobsite wrapper 105. The wrapper 105 can make simplified procedure calls to the construction jobsite system API. For example, the wrapper 105 can implement API methods of the construction jobsite system with its own sets of inputs, functions, and procedures that face the integrator platform 132. Whereas the construction jobsite system's API may be cumbersome, requiring HTTP URL calls and interpreting Javascript return values, the wrapper 105 can simplify development by managing these complexities. For example, a procedure GetProjects( ) may return all project data in a deserialized object array of Projects (where Projects is a class contained or utilized in the Wrapper class), handling conversion to and from the API formats.

On the other side of the integrator platform 132, plugins 150 can act as interfaces to one or more endpoints. The plugins 150 used by the integrator platform 132 can create extensions to do the actual work between the endpoint and the wrapper 105. Whereas the wrapper 105 can be used to communicate to the field managing system, a selected plugin 150 can be used to communicate with an endpoint.

The integrator platform 132 can execute to connect a plugin 150 with the construction jobsite wrapper 105. The integrator platform 132 can open a configuration file. The integrator platform 132 can select the configuration file that is read by a configuration reader 115 in one example. Each configuration file can specify a plugin 150 to execute. The configuration file can also include a command to supply to the plugin 150 for execution. The configuration reader 115 can be implemented to read particular configuration file types. For example, the configuration reader 115 can be an XML file reader, INI file reader, database, or text file reader.

Each plugin 150 can include a name and configuration options specific to itself. Example configuration options can include connection information to an endpoint (i.e., external system or tool), such as a database to be integrated with. Configuration options can also include project mapping between the construction jobsite system and the endpoint. In use, plugins 150 may include an initialization method that is passed an instantiated and connected version of the wrapper 105.

The plugins 150 may be selected and configured by a user through use of an extension interface 138 that is part of the integrator platform 132. As will be explained in more detail, the extension interface 138 can include a graphical user interface (GUI) that can allow a user to create tasks that will occur between an endpoint and the construction jobsite system by configuring selected plugins.

The integrator platform 132 can also utilize a logger 110. The logger 110 can be a library that is used for writing to text files, writing to the console, and other basic tasks associated with the integration.

Figure 2:
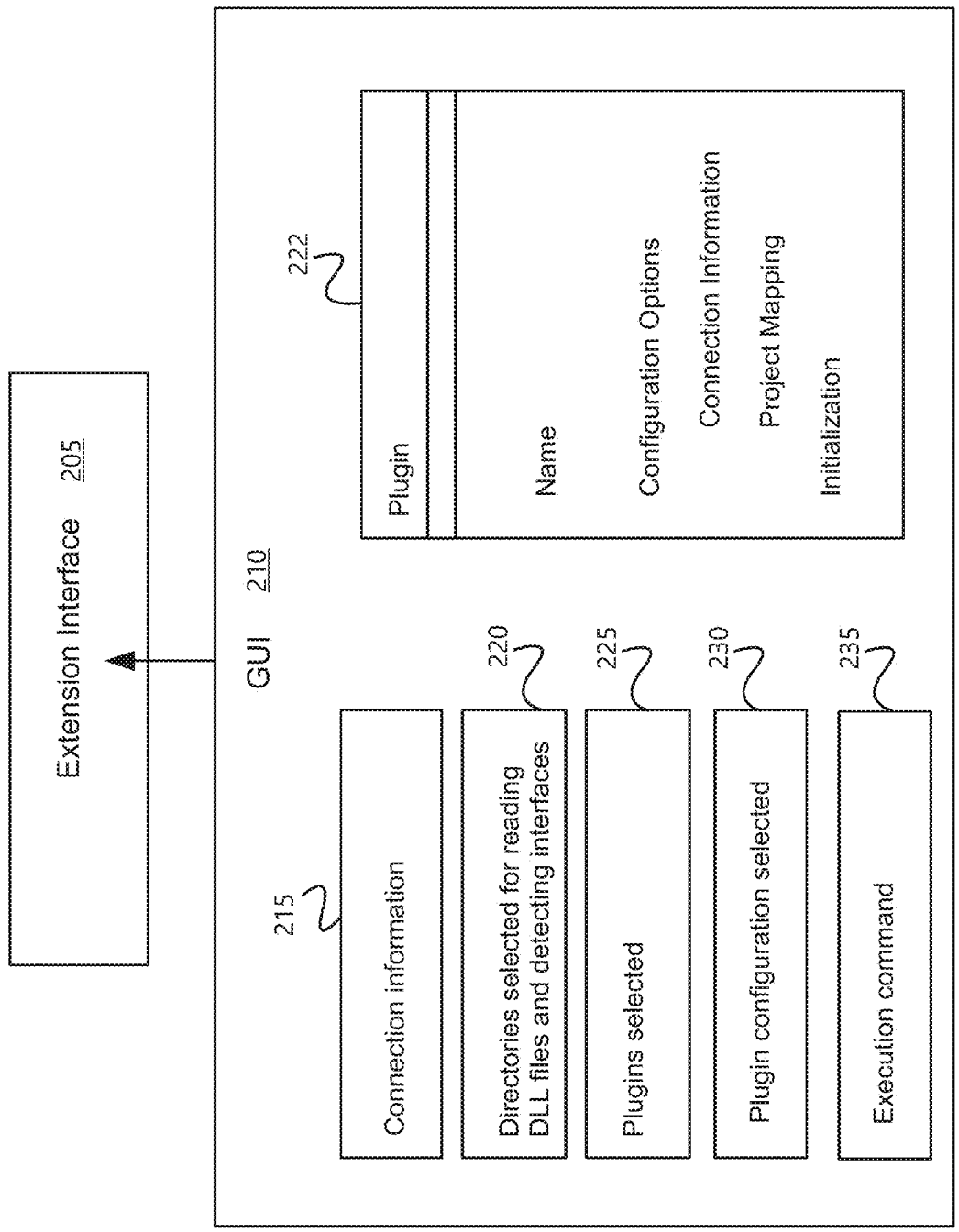
FIG. 2 is an exemplary block diagram for extending functionality of a construction jobsite system, in accordance with an embodiment.

Turning to FIG. 2, an example block diagram of stages 200 provided to a user via the GUI 210 of the extension interface 205 is depicted. At stage 215, a user can enter connection information for logging into the construction jobsite wrapper. The connection information can establish a connection with the wrapper instance that is passed to the executing plugin.

At stage 220, the user can select directories for relative plugin locations. In one example, compiled DLL files can be placed in one or more folders, and the integrator platform 132 can read those files to determine which plugins are available to run. The available plugins can populate a separate plugin section on the GUI 210.

At stage 225, the user can select one or more plugins. The plugin(s) can be specifically designed to communicate with one or more endpoint applications. Each plugin can extend an abstract interface such that the wrapper can communicate with the plugin and the plugin can communicate with the endpoint.

A plugin can include various information 222. For example, the plugin can include a name. The plugin can also include configuration options. The configuration options can include connection information for connecting to an endpoint. The configuration options can also include project mapping, which can map fields from the endpoint to the wrapper or construction jobsite system.

Selecting a plugin can populate a listing of configurations available for use with that plugin. At stage 230, the user can select at least one configuration to use with the plugin. Configuration files can be .INI files, but other file types are also possible. In this example, the configuration files are .INI files. However, other file types are possible, such as .XML files, text files, or any other file type that can specify values for use in the plugin.

Alternatively, the user can create a new configuration for the selected plugin. Creating the new configuration can include new connection information or new project mapping. For example, the user can map outputs of procedures of the plugins to inputs of procedures on the wrapper, or vice versa. Mapping can also include associating a field of an endpoint to a field of the wrapper. The field can include a file location. This can allow the user to create a mapping in the configuration information that maps a file or folder from an endpoint to a file or folder at the construction jobsite system.

After a plugin and configuration have been selected, at stage 235 the system can generate an execution command. The execution command can reference the configuration file. The user can place the execution command into a console for execution. Alternatively, the user can schedule the execution command to execute at scheduled intervals.

Figure 3:
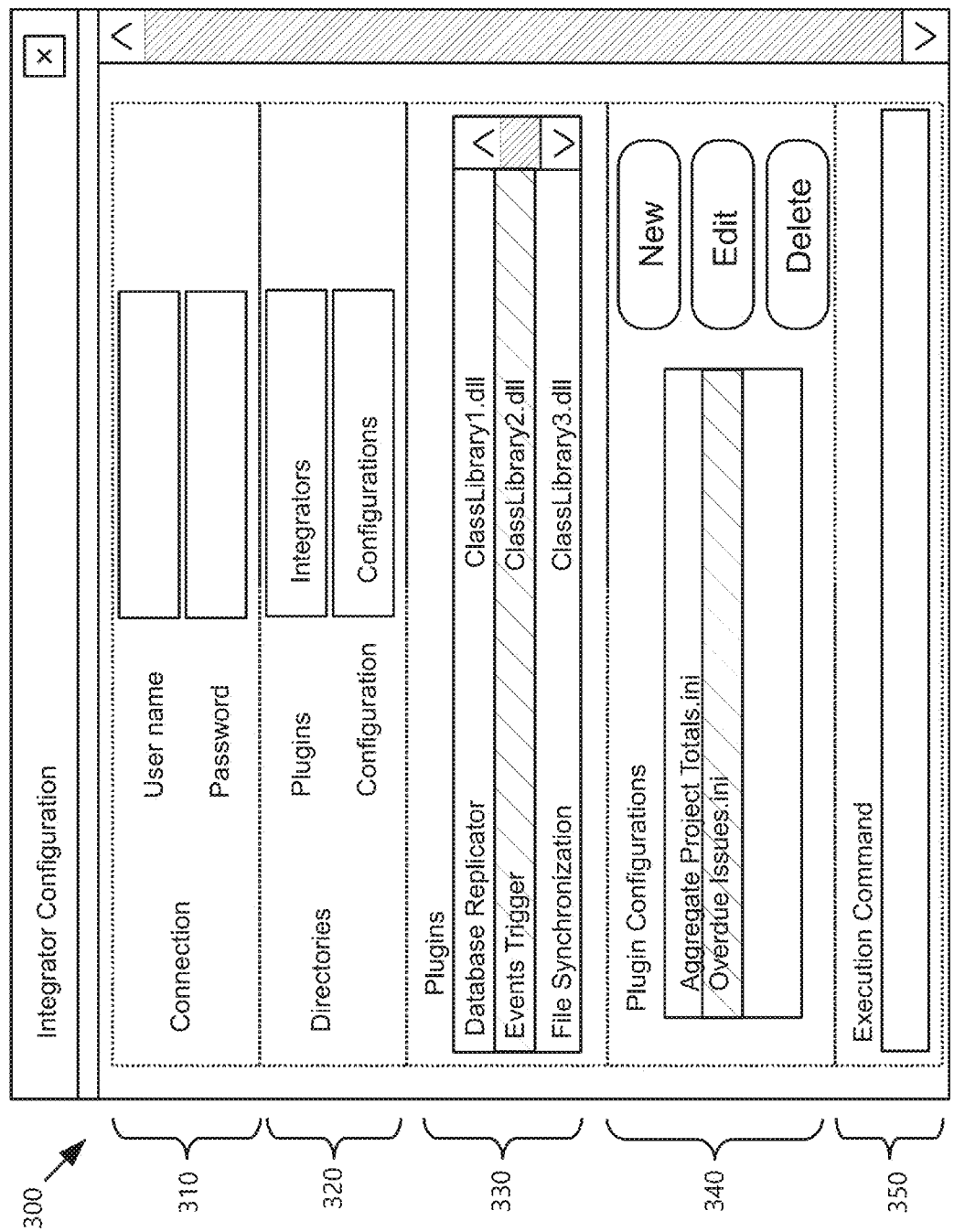
FIG. 3 is an exemplary illustration of a graphical user interface, in accordance with an embodiment.

Turning to FIG. 3, an example graphical user interface (GUI) 300 is presented. The GUI 300 can be used to perform the stages described in FIG. 2.

Connection section 310 can include fields for specifying connection information for connecting a plugin to an endpoint. In another example, the connection section 310 can include fields for specifying a connection to the wrapper.

Directory section 320 can include fields for specifying plugin and configuration directories. This can point the integrator platform to the correct location of plugins and configuration files that the user wishes to implement. For example, different endpoints can utilize different plugins. Therefore, the user can select a directory with plugins that operate with the endpoint that the user is trying to integrate with the construction jobsite system.

Plugin section 330 can be populated with plugins that are available at the selected plugin directory. Each plugin can implement an abstract class for integrating with the wrapper to the construction jobsite system. Each plugin can be coded to perform different work with relation to the construction jobsite system. For example, a first plugin can be used to replicate a database at the construction jobsite system. A second plugin can be used to trigger events at the construction jobsite system based on events that occur at the endpoint, or vice versa. A third plugin can be used to synchronize files between the plugin and the endpoint.

Figure 4:
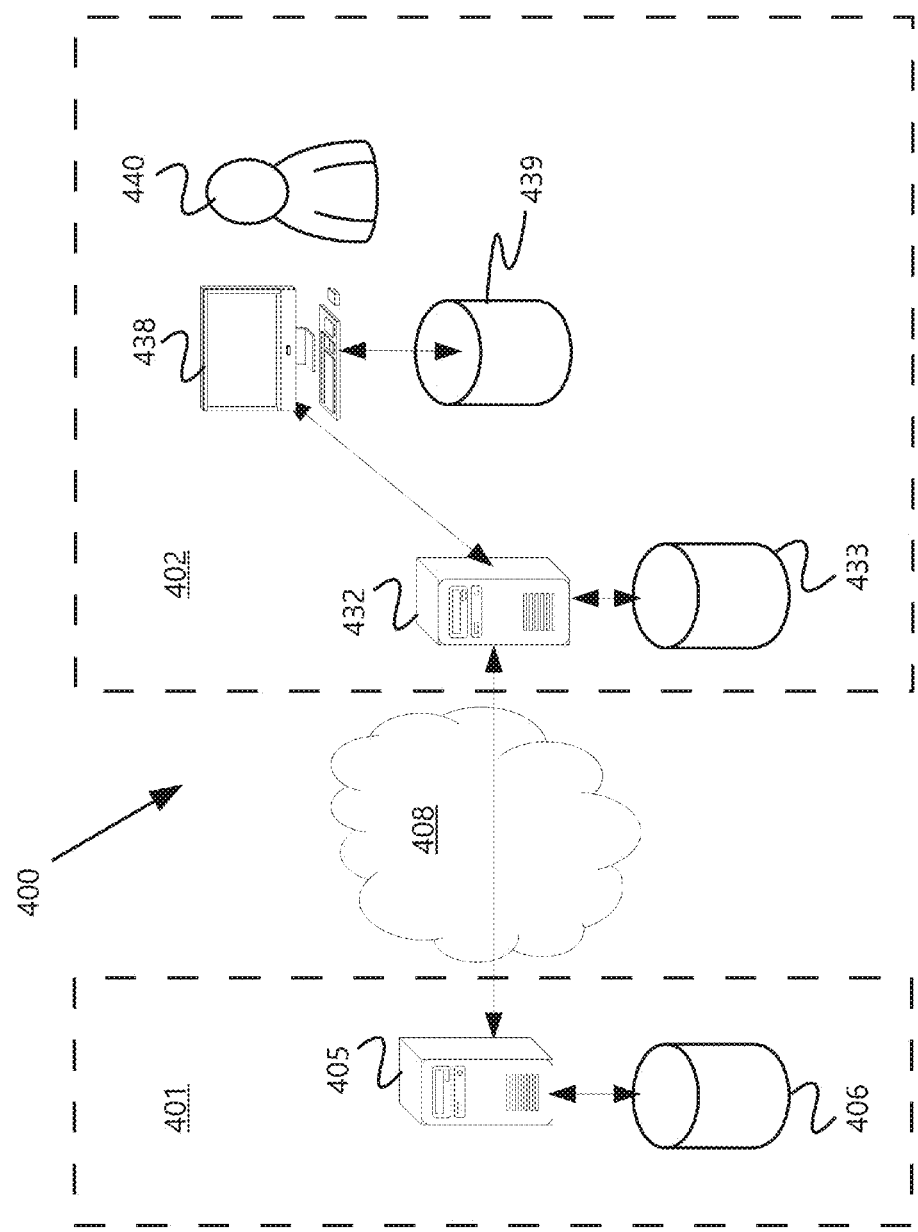
FIG. 4 is an exemplary illustration of a system for integrating a construction jobsite system with endpoints, in accordance with an embodiment.

The user can select one of the plugins at the plugin section 330. Based on the plugin selected, the configuration section 340 can populate with existing configurations for that plugin. In the example of FIG. 4, two different configurations are available for the events trigger plugin, including aggregate project totals and overdue issues. The configurations can specify how the plugin operates.

Alternatively, the user can edit a configuration or create a new plugin. This can allow the user to specify values that the plugin uses to determine how the plugin operates. For example, the user can specify how often or how overdue an issue must be before the events trigger plugin triggers an event in the endpoint or construction jobsite program.

Creating a new configuration can cause the system to present a GUI screen where a user maps endpoint fields or file locations to the construction jobsite system. An example will be discussed with regard to FIG. 8.

Continuing with FIG. 3, the execution command field 350 can generate an execution command for executing the plugin with the chosen configuration. The execution can be copied from the field in the GUI and pasted in a console, in one example. In another example, the execution command can be inserted manually or automatically into a scheduler software. This can cause the execution command to execute on a schedule, such as every day.

Example execution commands are provided below:

"C:\DevProjects\Field Integrator\bin\Field.Integrator.exe" "Overdue Issues.ini"

"C:\DevProjects\Field Integrator\bin\Field.Integrator.exe" "Sync to Local DB.ini"

Turning to FIG. 4, an exemplary system 400 for integrating an endpoint with a construction jobsite system 401 is shown. In this example, the user 440 may use his or her computing device 438 to integrate an endpoint operating on the computing device 438 with the construction jobsite system 401.

The construction jobsite system 401 can include a server 405 and a database 406. The construction jobsite system 401 can be accessed over a network 408, such as the Internet.

An endpoint can execute on the endpoint side 402 of the system. The endpoint can include a program or database executing on user device 438 or a connected database 439, in one example. For example, the endpoint can include EXCEL or some other analytics software. The endpoint can also include a cloud-based service that is separate from the construction jobsite system. The endpoint can be part of the user's local environment, but does not need to be within the user's local environment unless otherwise specified.

In one example, the endpoint can be a second construction jobsite system that is a separate instance from the first construction jobsite system. In this example, the integrator platform can be used to integrate the data between the two construction jobsite systems.

The endpoint can be integrated with the construction jobsite system 401 through the integrator platform, which can execute on an integration server 432. The integration server 432 can utilize a database 433 to, for example, store plugins and configurations. The database 433 can also be used for an endpoint database that is synchronized with database 406 of the construction jobsite system 401.

Each illustrated server 405 and 432 can comprise one or more servers. For example, server 405 may include a plurality of servers located all over the world at locations convenient for communicating with devices in particular geographic locations. For simplicity, FIG. 4 illustrates only one server, but embodiments with multiple servers for one or more of the entities are contemplated.

The computing device 438 can be any processor-based device, such as a personal computer, laptop, tablet, or cell phone. It can also include or be part of server 432 in one example. Additionally, the computing device 438 or server 432 can execute the integrator platform by executing a set of instructions stored locally or remotely on a computer-readable medium.

The integration server 432 can present a web interface on the computing device 438 that includes the graphical user interface for integrating endpoints with the construction jobsite system.

Figure 5:
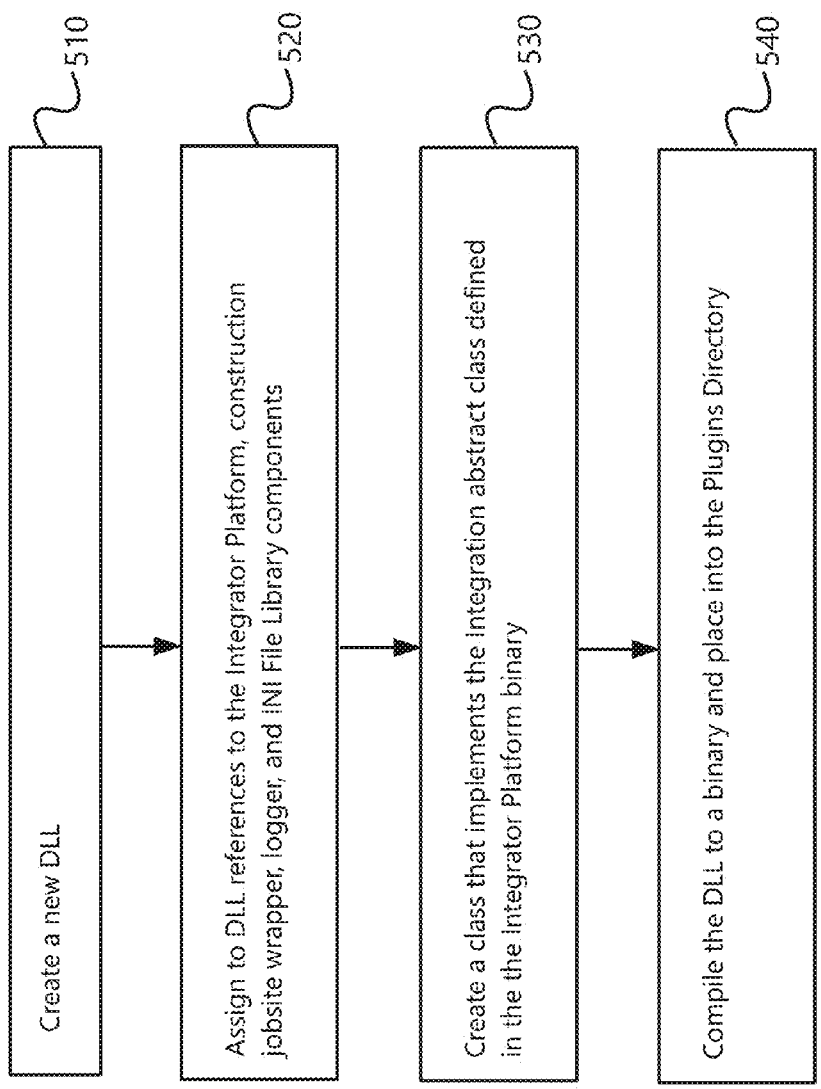
FIG. 5 is an exemplary flow chart with non-exhaustive listings of steps for creating a new integration plugin, in accordance with an embodiment.
Figure 6:
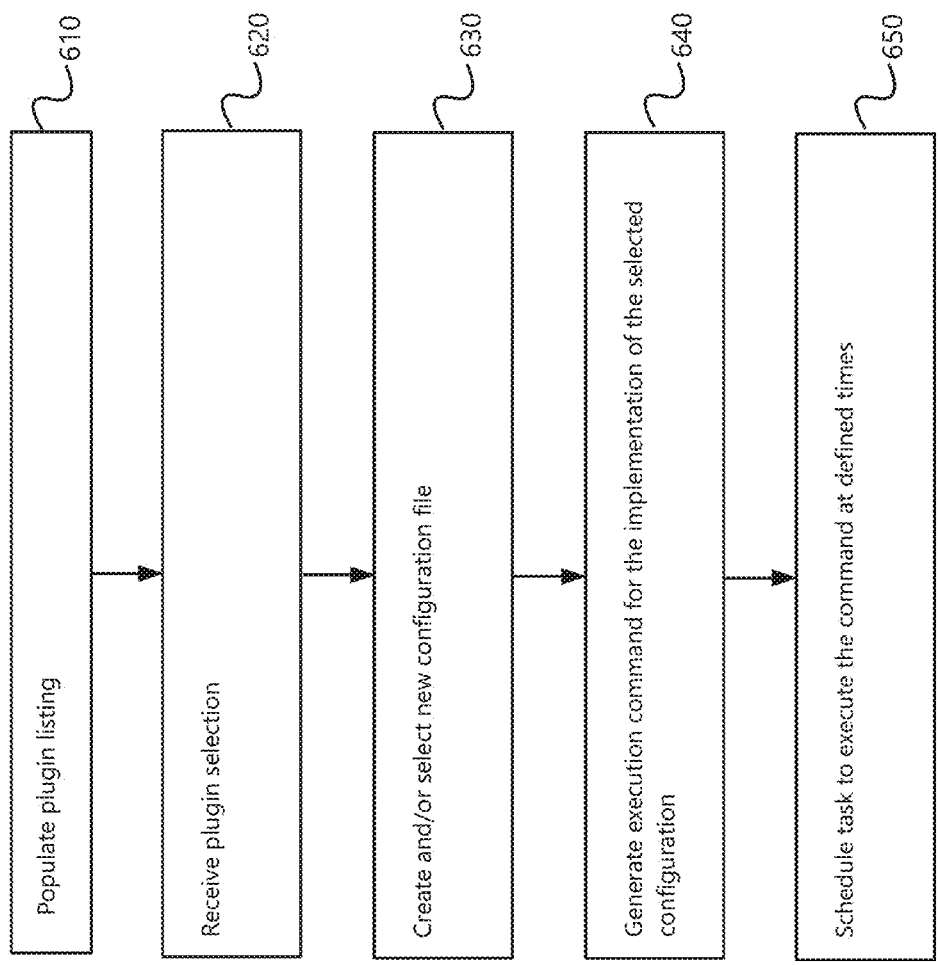
FIG. 6 is an exemplary flow chart with non-exhaustive listings of steps for configuring a plugin with an integration platform to create an execution command, in accordance with an embodiment.
Figure 7:
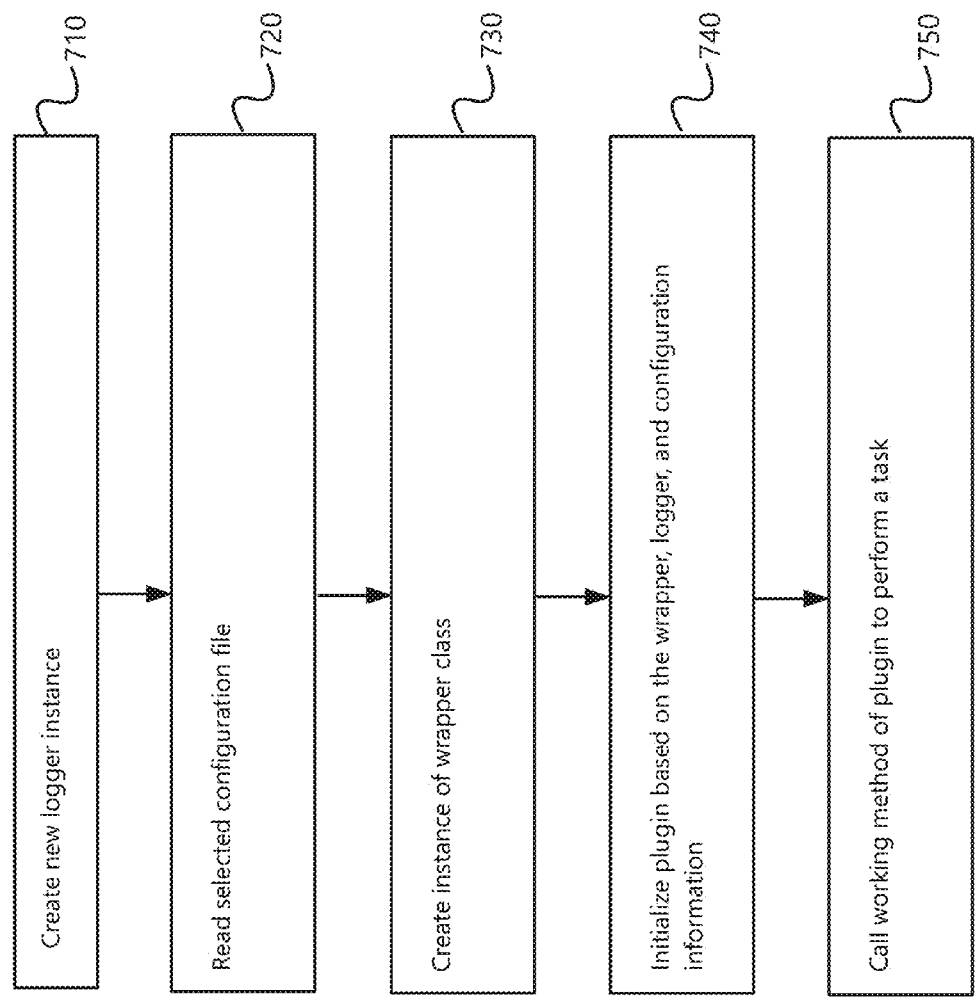
FIG. 7 is an exemplary flow chart with non-exhaustive listings of steps for executing a command based on a plugin configuration, in accordance with an embodiment.

FIGS. 5-7 provide example processes for creating a plugin, configuring the plugin, and executing the configured plugin.

Turning to FIG. 5, a flow chart with exemplary steps for creating a new plugin is presented. At step 510, the user can create a new DLL that references the integrator platform, construction jobsite wrapper, logger, and file library components. The user can assign these references to the DLL at step 520.

At step 530, the user can create a class that implements an integration abstract class. The integration abstract class can be defined in the integrator platform binary. The implementation can determine the functionality possible by the plugin. The implementation can rely on several variables that are further definable to allow for different plugin configurations.

At step 540, the DLL can be compiled to a binary and placed into the plugins directory. This can allow the integrator platform to retrieve the plugin for use in conjunction with a configuration.

FIG. 6 is a flow chart with exemplary steps for configuring a plugin. At step 610, the integrator platform can populate the plugin listing. This can be based on the user selecting a plugin directory.

At step 620, the integrator platform can receive a plugin selection from the user. Then, at step 630, the user can select an option to use an existing configuration file, select an option to edit an existing configuration file, or select an option to create a new configuration file.

Once a configuration file is selected, at step 640, the integration platform can generate an execution command. The execution command can be used to implement the plugin with the selected configuration. At step 650, the user can schedule the execution of the command.

FIG. 7 is a flow chart with exemplary steps for executing a configured plugin. At step 710, the integrator platform can create a new instance of a logger. The logger can allow the integrator platform to write commands to the console and text log files, in one example. The writing to both locations can occur substantially simultaneously, in one example.

At step 720, the integrator platform can read the selected configuration file. The configuration file can be an .INI file, and can include information on the respective plugin file (e.g., DLL). Because the configuration file can be created based on the plugin file, it can contain this association.

At step 730, an instance of the wrapper class can be created if not already active. Then, at step 740, the plugin can be initialized. This can include a DLL file receiving the wrapper instance, the logger instance, and configuration information from the configuration file. This can allow the integration platform to connect the endpoint to the construction jobsite system through the plugin implementation. The plugin can report to the integrator platform regarding whether initialization was successful.

If initialization was successful, at step 750, the integrator platform can call a method in the plugin to cause it to perform the tasks specified in the plugin according to the specific configuration. It can connect to the wrapper and endpoint in carrying out the tasks.

Figure 8:
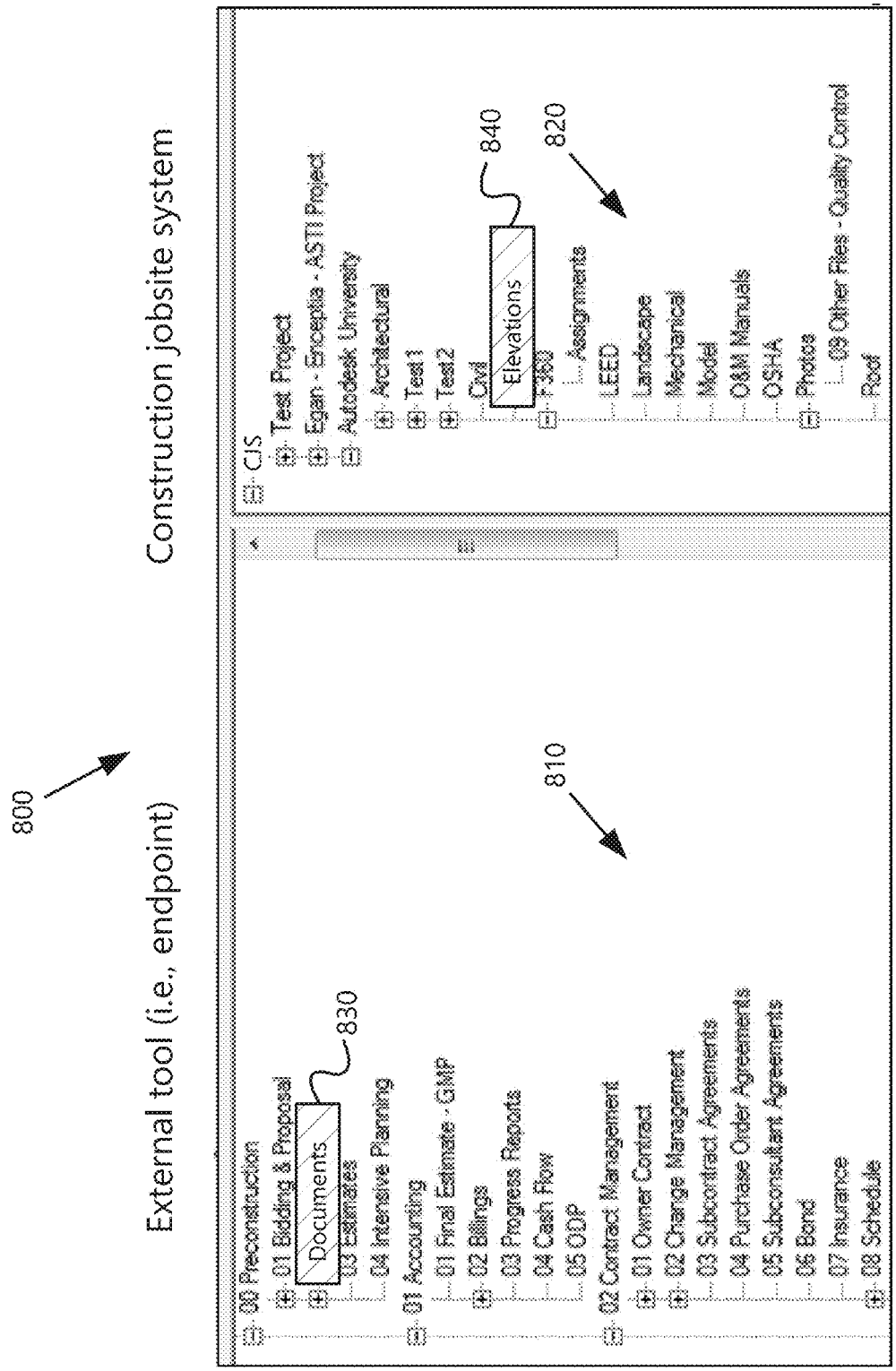
FIG. 8 is an exemplary GUI for mapping file locations between an endpoint and a construction jobsite system, in accordance with an embodiment.

FIG. 8 is an example GUI screen 800 for creating a plugin configuration for file synchronization using an integration platform. In this example, when the user selects a plugin for file synchronization and edits or creates a configuration, the integration platform can present screen 800 to the user for specifying file mapping.

In one example, the user can be presented with a first file directory 810 used by an endpoint associated with the plugin, and a second file directory 820 associated with the construction jobsite system. The user can create a mapping between files at the two locations by selecting a first location 830 at the endpoint that corresponds to a second location 840 at the construction site system. In this example, using the mapping configuration, a synchronization plugin can be configured to synchronize files between the mapped locations.

The synchronization can be based on hash values between files. For example, a file with the same name at each location can be hashed to determine if they are the same. The hashing can occur at scheduled times, when the execution command can cause the plugin configuration to execute. In another example, file time stamps can be compared. When the files are not the same, the more recent file can be replicated to the other system using procedure calls at the wrapper and endpoint that are called by the executing plugin.

Figure 9A:
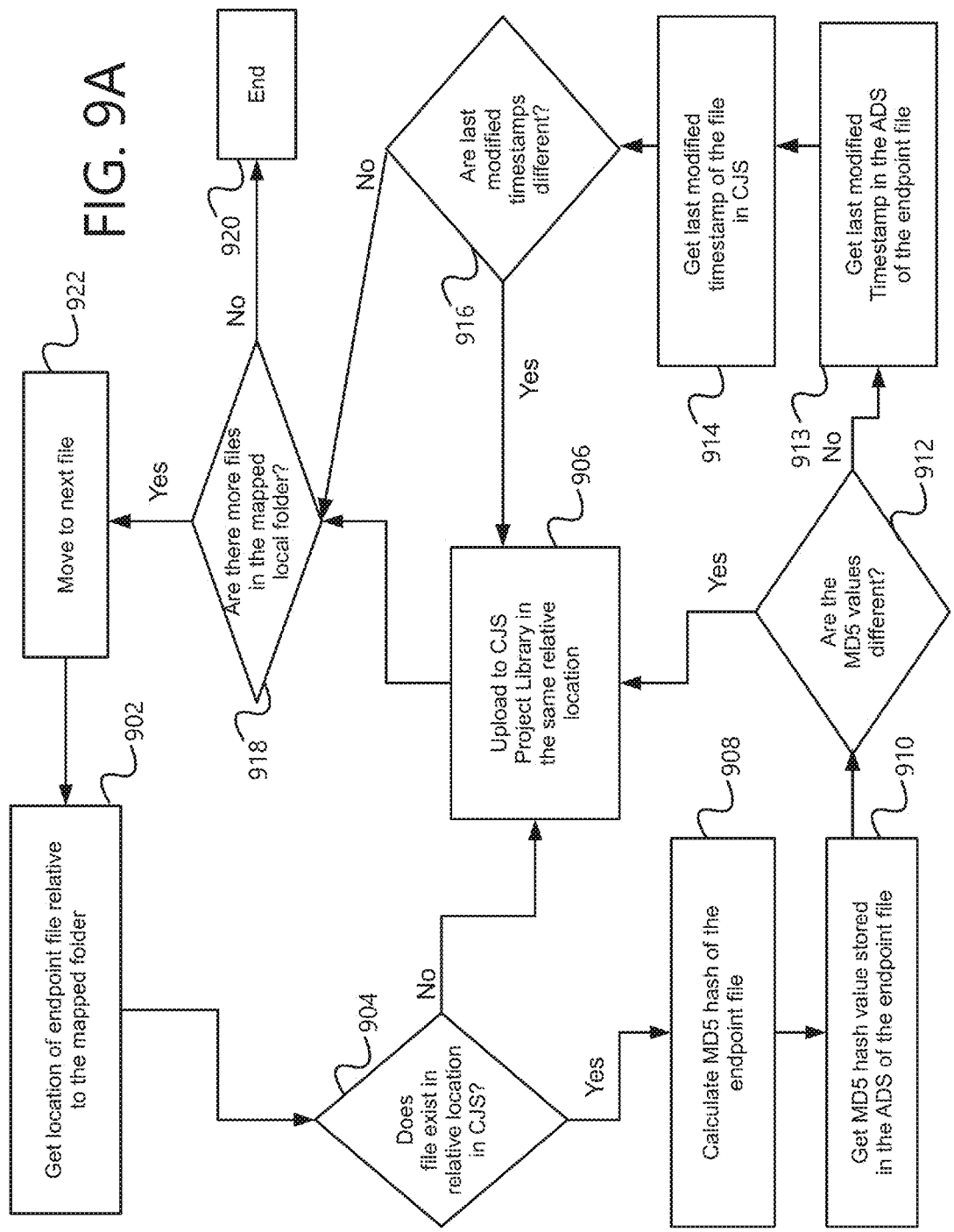
FIGS. 9A-B are exemplary flow charts with non-exhaustive listings of steps for synchronizing files between an external tool and a construction jobsite system, in accordance with an embodiment.

FIG. 9A depicts an exemplary method for a binary file synchronization from an endpoint to a construction jobsite system. At step 902, the integrator platform (via the executing plugin configuration) can retrieve a first location of a first file at an endpoint. The first location can be defined in a mapping that is stored as part of a configuration file.

At step 904, the system can check to see if the first file also exists at a second location in the construction jobsite system (CJS). The second location can also be stored in the configuration file as part of the mapping. The check can be performed by calling a procedure in the instance of the wrapper, which in turn can make low-level calls to the CJS to check whether the first file exists at the second location.

If the first file does not exist at the second location, at step 906, the system can upload the first file to the construction jobsite system. Again, the system can utilize procedure calls to the wrapper to upload the first file.

If the first file does exist at the second location, at step 908, the system can calculate an MD5 hash of the first file at the endpoint. Alternatively, a different hash method can be used. As a further alternative, the system can retrieve the file size and modification date of the first file at the endpoint.

At step 910, the system can retrieve the MD5 hash value (and/or other corresponding value of step 908) in an alternate data stream (ADS) of the first file at the endpoint. An ADS can allow metadata to be associated with a file directly on a file system (e.g., the endpoint) without altering the binary information of the default data stream (which is what the endpoint reads). Each file can contain any number of data streams.

At step 912, the system can compare the retrieved MD5 hash value from the ADS with the calculated MD5 hash value of step 908. If the two values are not the same, then the first file has been updated at the endpoint since the last synchronization. At step 906, the updated first file is uploaded to the second location at the CJS.

If the two values are the same, this means that the first file has not been updated since the last synchronization operation. At step 913, the system can retrieve the last modified timestamp in the alternate data stream of the endpoint file. Then, at step 914, the system can retrieve the last modified timestamp of the first file on the CJS. At step 916, the system can compare the timestamps to determine if the endpoint timestamp is more recent. If so, then at step 906 the system can upload the first file from the endpoint to the CJS.

At step 918, the system can determine if there are more files in the mapped endpoint directory. If so, then at step 922, the process repeats. If not, then at step 920, the process ends.

Figure 9B:
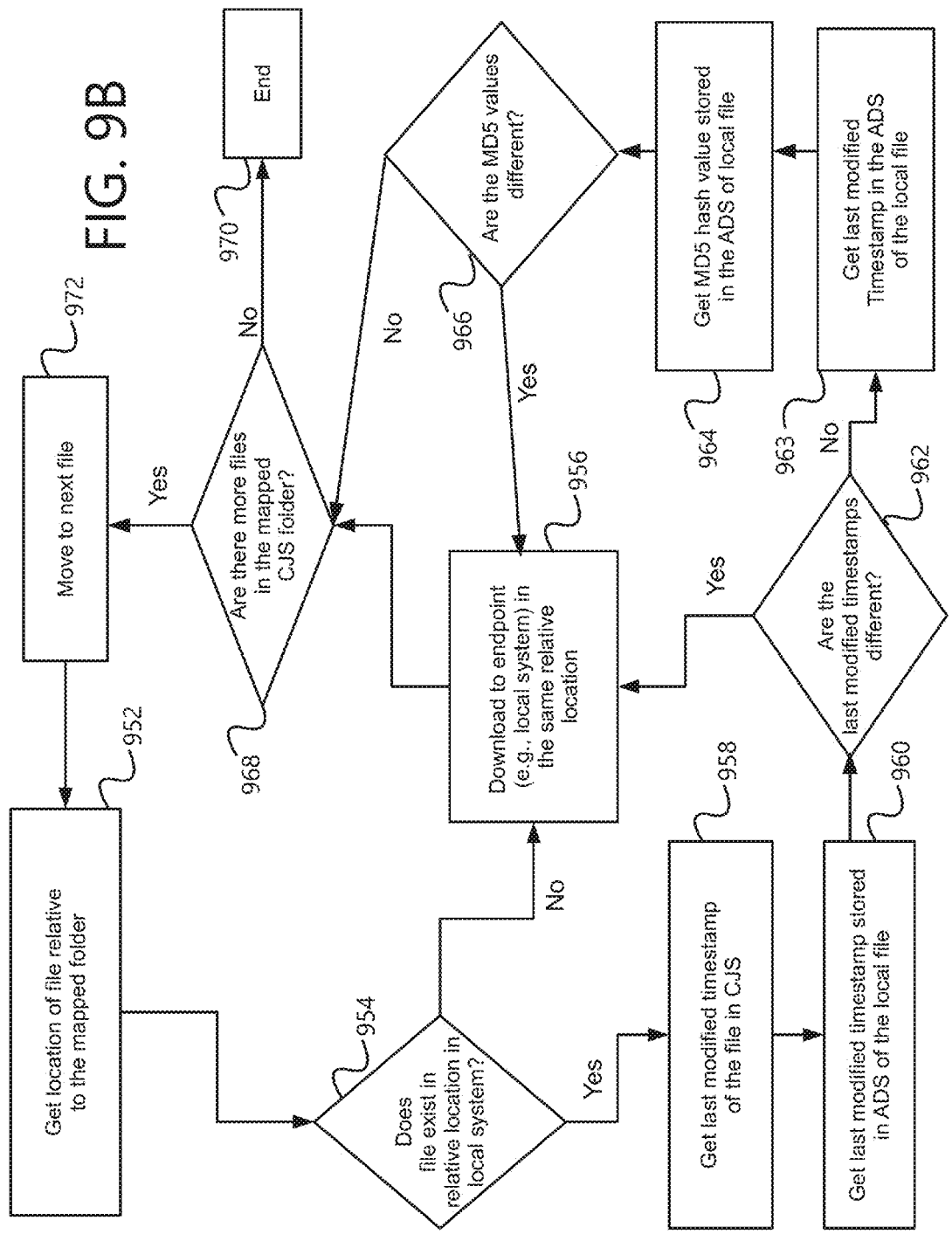

FIG. 9B depicts a similar exemplary method for a binary file synchronization from a construction jobsite system to an endpoint. At step 952, the system can retrieve a mapped location at the endpoint corresponding to a file on the CJS. At step 954, the system can determine if the file exists at the mapped location. If not, it is downloaded to the endpoint at step 956.

If the file does exist, then a timestamp comparison between the file on CJS and the ADS on the endpoint are compared at steps 958 and 960. If the timestamps are different at step 962 (and the timestamp at CJS is greater), then the file can be downloaded to the endpoint at step 956. Otherwise, at steps 963 and 964, the hash can be calculated for the endpoint file and compared against the ADS hash at the endpoint at steps 963 and 964. If the hash values are different at step 966, this means the endpoint file has been modified. In one example, the CJS file can be downloaded at step 956.

When a file is copied from the CJS to the endpoint at step 956, the system can store the MD5 hash value of the file at the endpoint. This can note the hash value of the file the last time a file sync was made. The system can also store the last modified timestamp recorded in CJS version of the file. This can allow the system to later determine if the CJS file has been updated based on a timestamp comparison.

At step 968, the system can determine if there are more files in the mapped construction jobsite system folder. If so, then at step 972 the system can move to the next file and repeat the process. Otherwise, the process can end at step 970.

Figure 10:
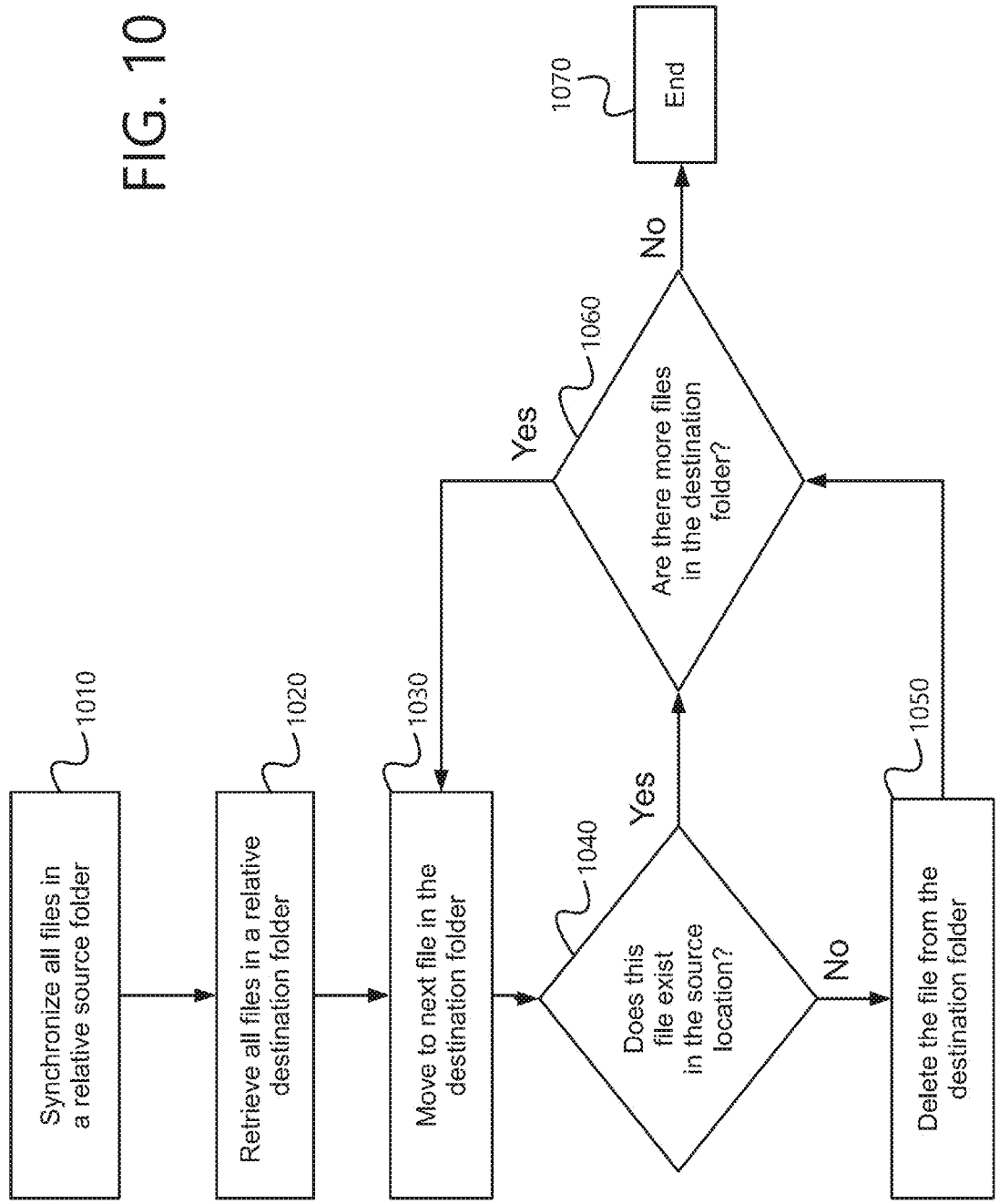
FIG. 10 is an exemplary flow chart with non-exhaustive listings of steps for deleting files in one-way synchronization, in accordance with an embodiment.

FIG. 10 is an exemplary method for deleting files from a destination folder in a one-way synchronization. In a one-way synchronization, files can be moved from one system to the other, effectively mirroring one system at the other location. In this type of system, deleting a file at the source can cause the file to also be deleted at the destination. The process can operate similarly regardless of whether the construction jobsite system or the endpoint is the source.

At step 1010, the system can synchronize all files in a relative source folder. Then at step 1020, the system can retrieve all files in a relative destination folder. This can be done one file at a time, as shown at step 1030.

For each file, at step 1040, the system can determine if the file at the relative destination location also exists at the source location. If not, at step 1050, the configured plugin can cause the system to delete the file at the destination location.

Then the process can move to the next file in the destination folder at step 1060. Once no more files are left to synchronize, at step 1070, the process can end.

Figure 11:
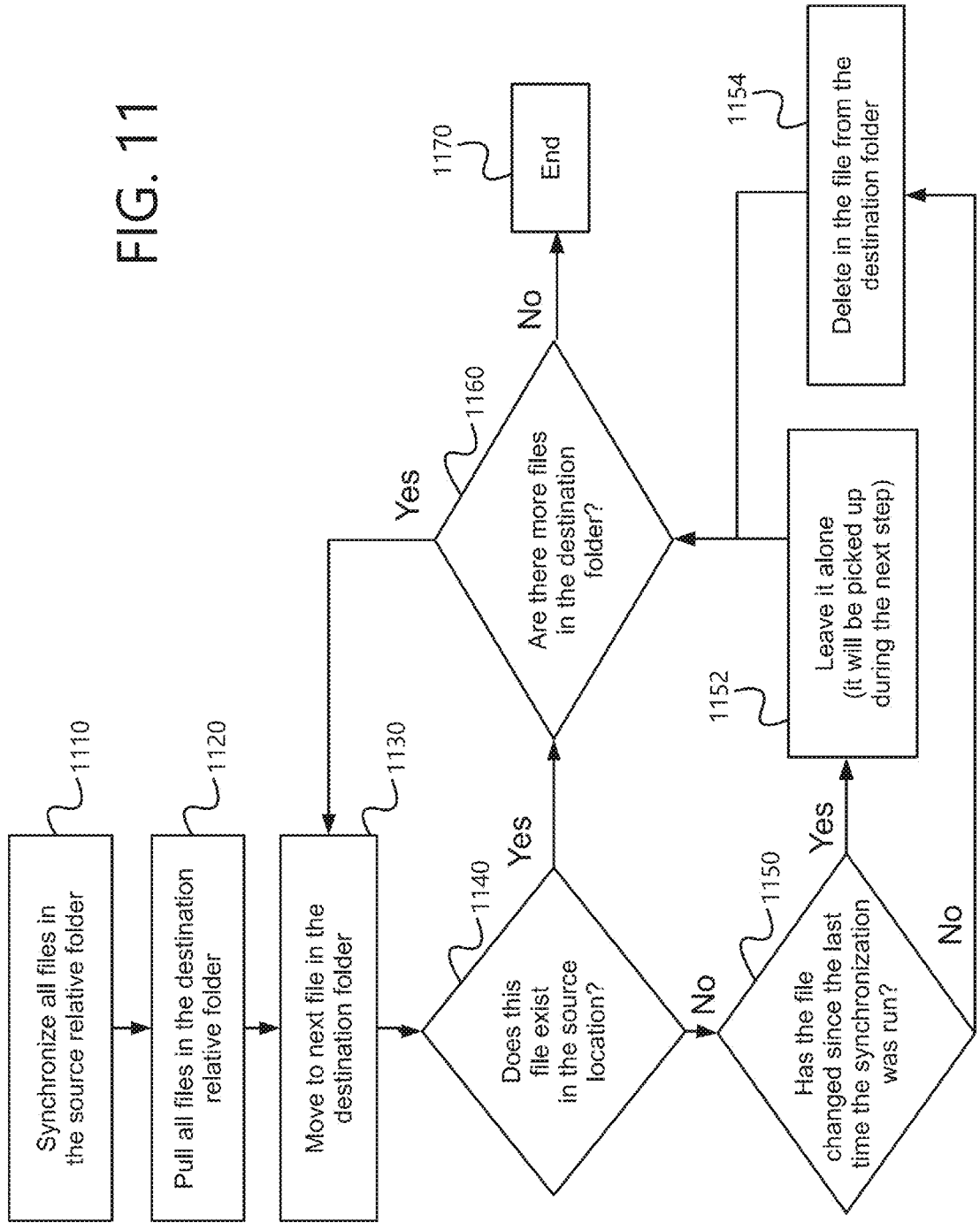
FIG. 11 is an exemplary flow chart with non-exhaustive listings of steps for deleting files in two-way synchronization, in accordance with an embodiment.

FIG. 11 is an exemplary method for two-way synchronization. The configured plugin can determine whether a destination file has changed since the last time the synchronization was run in order to decide whether to delete it or replicate it to the source.

Steps 1110, 1120, 1130, 1160, and 1170 are performed as described for steps 1010, 1020, 1030, 1060, and 1070, respectively, of FIG. 10.

At step 1140, the plugin can cause the system to determine if a file exists at the source location. If not, at step 1150, the plugin can cause the system to determine if the file has changed since the last time the synchronization was run. If it has changed, this indicates it is a new file, so it is not deleted at step 1152. Instead, it can be replicated to the source.

If the file has not changed since the last synchronization, this means it was deleted from the source. Therefore, at step 1154, it can be deleted from the destination.

This process continues for additional files at step 1160.

Figure 12:
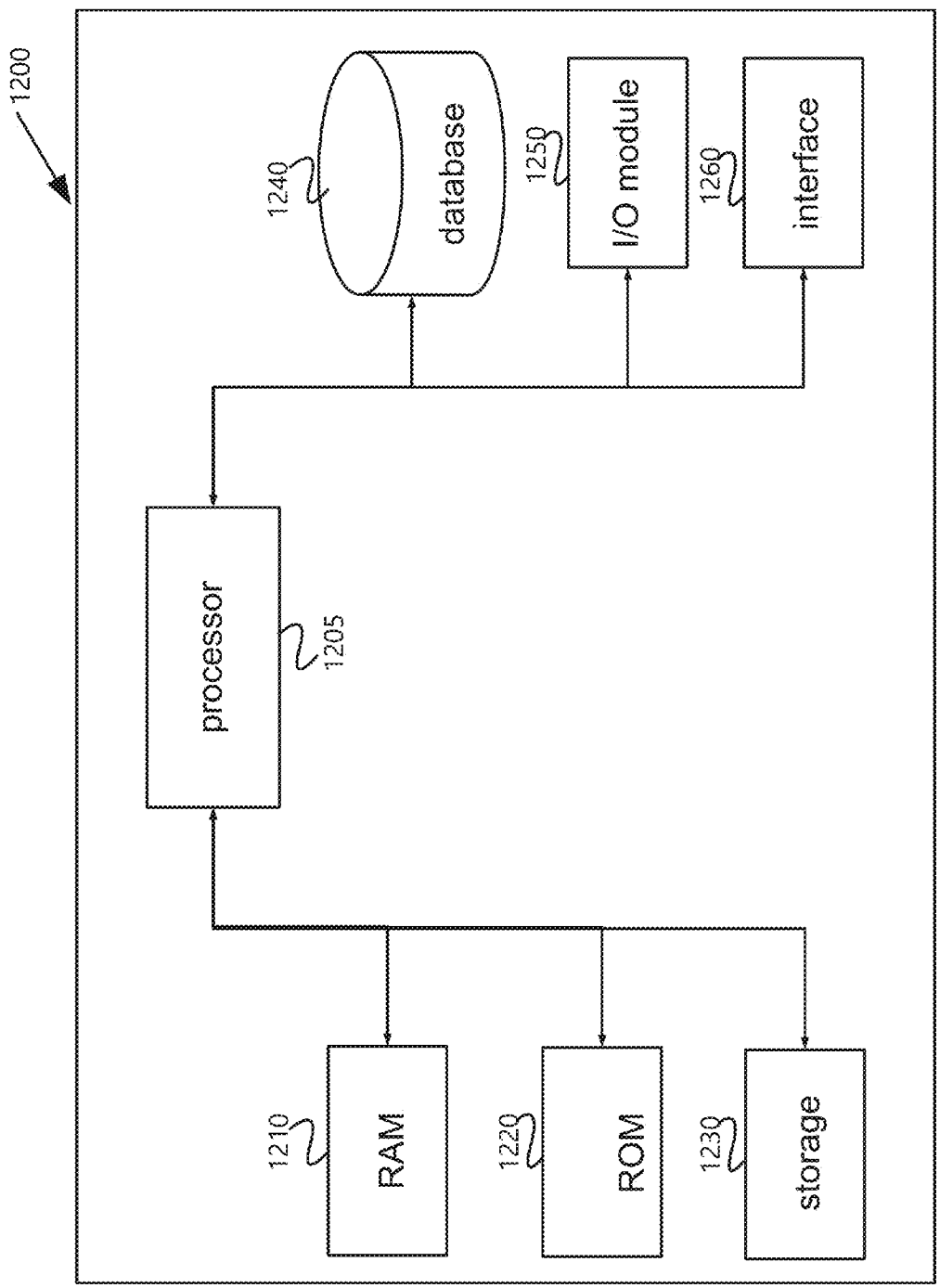
FIG. 12 is an exemplary illustration of system components, in accordance with an embodiment.

FIG. 12 depicts an exemplary processor-based computing system 1200 representative of the type of computing system that may be present in or used in conjunction with a server 405, 432, or device 438 of FIG. 4. Continuing with FIG. 12, the computing system 1200 is exemplary only and does not exclude the possibility of another processor- or controller-based system being used in or with one of the aforementioned components. Additionally, a server 405, 432, or a user device 438 need not include all the system hardware components in an embodiment.

In one aspect, system 1200 may include one or more hardware and/or software components configured to execute software programs, such as software for storing, processing, and analyzing data. For example, system 1200 may include one or more hardware components such as, for example, processor 1205, a random access memory (RAM) module 1210, a read-only memory (ROM) module 1220, a storage system 1230, a database 1240, one or more input/output (I/O) modules 1250, and an interface module 1260. Alternatively and/or additionally, system 1200 may include one or more software components such as, for example, a computer-readable medium including computer-executable instructions for performing methods consistent with certain disclosed embodiments. It is contemplated that one or more of the hardware components listed above may be implemented using software. For example, storage 1230 may include a software partition associated with one or more other hardware components of system 1200. System 1200 may include additional, fewer, and/or different components than those listed above. It is understood that the components listed above are exemplary only and not intended to be limiting.

Processor 1205 may include one or more processors, each configured to execute instructions and process data to perform one or more functions associated with system 1200. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 12, processor 1205 may be communicatively coupled to RAM 1210, ROM 1220, storage 1230, database 1240, I/O module 1250, and interface module 1260. Processor 1205 may be configured to execute sequences of computer program instructions to perform various processes, which will be described in detail below. The computer program instructions may be loaded into RAM for execution by processor 1205.

RAM 1210 and ROM 1220 may each include one or more devices for storing information associated with an operation of system 1200 and/or processor 1205. For example, ROM 1220 may include a memory device configured to access and store information associated with system 1200, including information for identifying, initializing, and monitoring the operation of one or more components and subsystems of system 1200. RAM 1210 may include a memory device for storing data associated with one or more operations of processor 1205. For example, ROM 1220 may load instructions into RAM 1210 for execution by processor 1205.

Storage 1230 may include any type of storage device configured to store information that processor 1205 may need to perform processes consistent with the disclosed embodiments.

Database 1240 may include one or more software and/or hardware components that cooperate to store, organize, sort, filter, and/or arrange data used by system 1200 and/or processor 1205. For example, database 1240 may include user-specific account information, including password information as it relates to shared media content. Alternatively, database 1240 may store additional and/or different information. Database 1240 may also contain a plurality of databases that are communicatively coupled to one another and/or processor 1205, which may be one of a plurality of processors utilized by server 1230.

I/O module 1250 may include one or more components configured to communicate information with a user associated with system 1200. For example, I/O module 1250 may include a console with an integrated keyboard and mouse to allow a user to input parameters associated with system 1200. I/O module 1250 may also include a display including a graphical user interface (GUI) for outputting information on a monitor. I/O module 1250 may also include peripheral devices such as, for example, a printer for printing information associated with system 1200, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 1260 may include one or more components configured to transmit and receive data via a communication network, such as the Internet, a local area network, a workstation peer-to-peer network, a direct link network, a wireless network, or any other suitable communication platform. For example, interface 1260 may include one or more modulators, demodulators, multiplexers, demultiplexers, network communication devices, wireless devices, antennas, modems, and any other type of device configured to enable data communication via a communication network.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for integrating a construction jobsite system with a plurality of endpoints, the system comprising:
   a non-transitory computer-readable medium containing instructions;
   a communication interface that receives user inputs;
   a processor in communication with the communication interface and the non-transitory computer-readable medium, the processor instantiating a wrapper that extends application program interface for the construction jobsite system;
   a plurality of plugins stored on the non-transitory computer-readable medium, wherein each of the plurality of plugins extends an abstract interface to the wrapper and includes connection information to a respective endpoint among the plurality of endpoints; and
   an integration platform executed by the processor, the integration platform performing stages including:
      providing an extension interface that receives user inputs including:
         a first input defining connection information for the construction jobsite system from the respective endpoint; and
         a second input selecting a first plugin from the plurality of plugins;
      creating a configuration file for the first plugin using the connection information; and
      creating an execution command based on the configuration file;
   wherein the execution command causes the processor to perform further stages including:
      retrieving configuration information from the configuration file, the configuration information including the connection information;
      initializing the first plugin using the configuration information, wherein initializing the first plugin includes sending an instance of the wrapper to the plugin;
      converting, via the plugin, a first procedure compatible with the respective endpoint to a second procedure compatible with the wrapper;

converting, via the wrapper, the second procedure to a third procedure compatible with the construction jobsite system; and translating, via the instance of the wrapper, data between the construction jobsite system and the respective endpoint, wherein translating the data includes sending a command from the respective endpoint to the instance of the wrapper, wherein the instance of the wrapper converts the command to an HTTP uniform resource locator call and utilizes the configuration information.

2. The system of claim 1, wherein the stages performed by the processor further include calling functions at the wrapper based on instructions in the first plugin based on the configuration information.

3. The system of claim 2, wherein the stages performed by the processor further include creating the first plugin, wherein the first plugin references the integration platform, the wrapper, a logger class, and a configuration file library.

4. The system of claim 1, wherein the processor executes the execution command as part of a scheduled task.

5. The system of claim 1, wherein instantiating the first plugin includes executing an initialization method that is passed to the instance of the wrapper, an instance of a logger, and the configuration information.

6. The system of claim 1, wherein the first plugin includes code defining a task to be done between the endpoint and the construction jobsite system, wherein performance of the task is impacted by configuration information, and wherein the code is executed based on the execution command.

7. The system of claim 6, wherein the first plugin performs file synchronization, and wherein the configuration information includes field mapping.

8. The system of claim 7, wherein the synchronization includes, for a first file, calculating a hash value and checking the calculated hash value against a hash value of an alternate data stream of the first file.

9. The system of claim 7, wherein the synchronization includes editing metadata of a first file associated with a location of the first file without altering binary information of the first file.

10. The system of claim 7, wherein the synchronization includes comparing a last synchronization date to a modified date of an alternate data stream of a first file, and determining whether to delete the first file based on the comparison.

11. A non-transitory computer-readable medium containing instructions that are executed by a processor, causing the processor to perform stages including:

receiving user selection of a plugin and a configuration file for interfacing an endpoint with a wrapper of a construction jobsite software;

generating a command for execution based on the selected plugin and configuration file; and at the start time, executing the command, wherein executing the command includes:

retrieving configuration information from the configuration file;

instantiating an instance of the wrapper using the configuration information, wherein the wrapper extends an abstract class based on an application program interface for the construction jobsite system;

initializing the selected plugin based on the configuration information, wherein initializing the selected plugin also includes sending the instance of the wrapper to the selected plugin;

converting, via the instance, a first procedure compatible with the endpoint to a second procedure compatible with the construction jobsite system; and translating, via the instance, data between the construction jobsite system and the endpoint, wherein translating the data includes sending a command from the endpoint to the instance of the wrapper, wherein the instance of the wrapper converts the command to an HTTP uniform resource locator call and utilizes the configuration information.

12. The non-transitory computer-readable medium of claim 11, wherein the configuration file contains mapping information for translating the first procedure to the second procedure.

13. The non-transitory computer-readable medium of claim 11, wherein the selected plugin includes database replication instructions.

14. The non-transitory computer-readable medium of claim 11, wherein the selected plugin performs file synchronization, and wherein the configuration information includes field mapping.

15. The non-transitory computer-readable medium of claim 14, wherein the synchronization includes, for a first file, calculating a hash value and checking the calculated hash value against a hash value of an alternate data stream of the first file.

16. The non-transitory computer-readable medium of claim 14, wherein the synchronization includes editing metadata of a first file associated with a location of the first file without altering binary information of the first file.

17. The non-transitory computer-readable medium of claim 14, wherein the synchronization includes comparing a last synchronization date to a modified date of an alternate data stream of a first file, and determining whether to delete the first file based on the comparison.

18. A system for integrating a construction jobsite system with a plurality of endpoints, the system comprising:

an interface that receives connection information, a first selection of a plugin, and a second selection of configuration information, wherein the interface generates an execution command;

a processor that executes the execution command to perform stages including:

reading the configuration information to initialize a plugin, wherein the plugin connects to an endpoint;

sending an instance of a construction jobsite wrapper to the plugin, wherein the wrapper connects to the construction jobsite system;

mapping a first file at the endpoint to a second file at the construction jobsite system;

modifying the first file based on the second file; and translating, via the instance, data between the construction jobsite system and the endpoint, wherein translating the data includes sending a command from the endpoint to the instance of the wrapper, wherein the instance of the wrapper converts the command to an HTTP uniform resource locator call and utilizes the configuration information.

19. The system of claim 18, wherein the stages further comprise:

calculating a hash value for the first file and comparing the calculated hash value against a hash value of an alternate data stream of the first file;

editing location metadata of the first file without altering binary information of the first file; and comparing a last synchronization date to a modification date of an alternate data stream of a first file, and determining whether to delete the first file based on the comparison.

* * * * *